United States Patent [19]

Tumminelli et al.

[11] Patent Number: 5,166,940
[45] Date of Patent: Nov. 24, 1992

[54] FIBER LASER AND METHOD OF MAKING SAME

[75] Inventors: Richard P. Tumminelli, Ashland; Farhad Hakimi, Watertown; Robert P. Dahlgren, Lynn, all of Mass.

[73] Assignee: The Charles Stark Draper Laboratory, Inc., Cambridge, Mass.

[21] Appl. No.: 710,766

[22] Filed: Jun. 4, 1991

[51] Int. Cl.$^5$ .............................................. H01S 3/17
[52] U.S. Cl. ........................................ 372/6; 372/75; 385/37; 385/15
[58] Field of Search ................. 372/75, 6, 92; 385/37, 385/15, 31, 141

[56] References Cited

U.S. PATENT DOCUMENTS

| | | | |
|---|---|---|---|
| 4,318,057 | 3/1982 | Buchwald et al. | 372/70 |
| 4,593,969 | 6/1986 | Goodman et al. | 385/37 |
| 4,835,778 | 5/1989 | Kafka et al. | 372/6 |
| 4,852,960 | 8/1989 | Alferness et al. | 385/37 |
| 5,084,880 | 1/1992 | Esterowitz et al. | 372/6 |

FOREIGN PATENT DOCUMENTS 2227359  7/1990  United Kingdom ............... 372/6

Primary Examiner—Georgia Y. Epps
Attorney, Agent, or Firm—Iandiorio and Dingman

[57] ABSTRACT

A fiber optic laser includes a fiber optic element, and a Bragg grating means in the fiber optic element and defined by a periodic variation in the index of refraction of the element to enhance the narrow band response of the laser and/or increase the loss of unwanted frequencies. A method of making the fiber laser is also disclosed.

31 Claims, 5 Drawing Sheets

FIBER LASER AND METHOD OF MAKING SAME

FIELD OF INVENTION

This invention relates to an improved single-frequency fiber laser, and more particularly to such a laser which uses integral, internal Bragg gratings.

BACKGROUND OF INVENTION

Fiber lasers, that is lasers made from a fiber optic element doped with a rare earth element such as erbium or neodymium or any other element that will cause optical gain, are appealing because they are single-mode waveguided and have high gain and high efficiency. Since these fiber optic elements are generally silica-based they are inhomogeneous line-broadening gain mediums. Therefore they lase over a broad band of wavelengths: they are not what is referred to as a single-frequency laser.

Thus additional, discrete, external optical components are required to select the desired wavelength or narrow band of wavelengths from all of those generated. Lasers other than fiber lasers do provide narrow bandwidths but they lack the simplicity and advantages of a fiber laser.

SUMMARY OF INVENTION

It is therefore an object of this invention to provide an improved fiber laser which performs as a single-frequency laser with a narrow bandwidth.

It is a further object of this invention to provide such a fiber laser which does not require additional, external frequency selective elements.

It is a further object of this invention to provide such a laser which uses a simple, integral optical element to produce the narrow band output.

It is a further object of this invention to provide such a laser which uses a simple non-invasive technique for creating the integral optical element.

It is a further object of this invention to provide such a laser which uses a photoreflectively induced optical element to produce the narrow band output.

It is a further object of this invention to provide such a laser which uses a Bragg grating to produce the narrow band output.

It is a further object of this invention to provide such a laser which uses a Bragg grating to enhance the creation of desired wavelengths and increase the loss of undesirable wavelengths.

It is a further object of this invention to provide an improved, simpler method of making such a fiber laser.

The invention results from the realization that a simple, single-frequency fiber laser can be achieved without additional, external frequency selective elements by using Bragg gratings as reflectors to create the resonant cavity and/or to create leakage ports or couplers to sharpen the desired frequency band of the laser and/or increase losses at undesired frequencies, respectively, and from the further realization that the Bragg gratings can be easily fabricated in the fiber optic element of the laser using photorefractive effects.

This invention features a fiber optic laser including a fiber optic element and Bragg grating means in the fiber optic element and defined by a periodic variation of the index of refraction of the element, which period is equal to one half the wavelength of a preselected lasing frequency for reflecting a narrow band of frequencies at the preselected frequency to establish a resonant cavity.

In a preferred embodiment the fiber optic element may be doped with a rare earth. The rare earth may be neodymium or erbium. The fiber optic element may be a single mode element and the Bragg grating means may include two spaced Bragg gratings with a resonator cavity between them. The Bragg grating may extend through the entire resonator cavity. The fiber optic element may be germanium-doped. The Bragg grating means may be fixed in the element with a photoreflective exposure. The Bragg grating may be integral with the fiber optic element. The fiber laser may be an oscillating laser or an amplifying laser.

The invention also features a fiber laser comprising a fiber optic element and a Bragg grating means disposed in the fiber optic element and defined by a periodic variation of the index of refraction of the element. The period establishes constructive and nonreflective interference to cause loss at a band of wavelengths other than the lasing frequency at a predetermined deflection angle.

In a preferred embodiment the fiber optic element may be doped with a rare earth which may be neodymium or erbium, and the fiber optic element may be a single-mode element. The Bragg grating means may include at least one Bragg grating for coupling out the unwanted other laser frequencies. Each Bragg grating has a period d defined by $\lambda$ divided by $n_l + n_0 \cos\theta$ where $n_0$ is the index of refraction of the fiber optic element cladding, $n_l$ is the index of refraction of the fiber optic element core, $\lambda\theta$ is the wavelength of the lasing frequency, and $\theta$ is the predetermined angle of deflection. The Bragg grating may extend through the resonator cavity. The fiber optic element may be germanium-doped and the Bragg grating may be fixed in the element with a photorefractive exposure. The Bragg grating may be integral with the fiber optic element. The fiber laser may be an oscillating laser or an amplifying laser.

The invention also features a fiber laser including a fiber optic element and Bragg grating means which function both as a reflecting medium to produce a narrow band of frequencies at the preselected lasing frequency, and a second Bragg grating means disposed in the fiber optic element for establishing constructive nonreflective interference to cause loss at a band of wavelengths other than the predetermined lasing frequency at a predetermined deflection angle.

The invention also features a method of making a fiber laser with an integral Bragg grating by doping the fiber optic element of the fiber laser with germanium to make it photo-refractively sensitive; and irradiating at least a portion of the fiber optic element with a pattern of ultraviolet radiation to induce a periodic variation in the refractive index of the fiber optic element core to define a Bragg grating. The invention also features a fiber laser made according to that method.

DISCLOSURE OF PREFERRED EMBODIMENT

Other objects, features and advantages will occur to those skilled in the art from the following description of a preferred embodiment and the accompanying drawings, in which.

Figure 1:
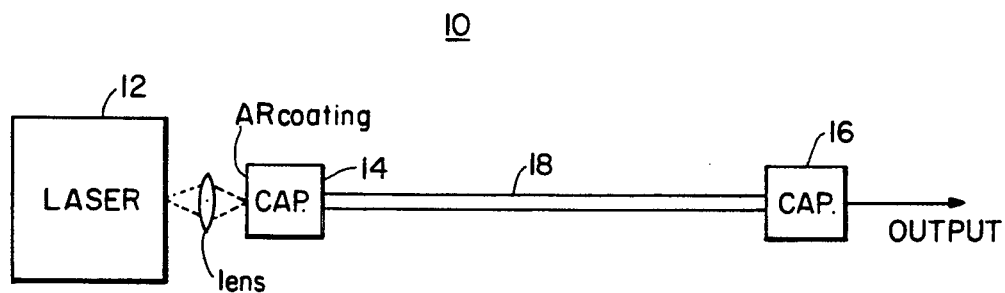
FIG. 1 is a simplified schematic block diagram of a fiber laser according to this invention.

There is shown in FIG. 1 a fiber laser 10 according to this invention including a pumping laser 12, coupling lens, an input capillary 14, and an output capillary 16. A fiber optic element 18 constitutes the entire fiber laser according to this invention, for within fiber optic element 18 is one or more Bragg grating elements which function to provide a narrow bandwidth output and/or increase the loss of unwanted frequencies in order to provide the narrowest output in the nature of a single-frequency laser. Fiber optic element 18 is typically doped with a rare earth element such as erbium or neodymium or some other element which provides the necessary optical gain to effect the lasing. It may also be doped with aluminum oxide in order to prevent clustering and in accordance with this invention it is doped with germanium to permit a photorefractive fabrication of a Bragg grating.

Figure 2:
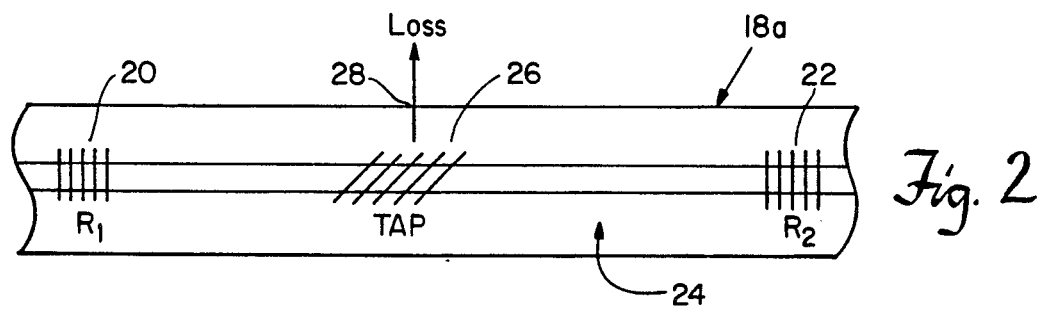
FIG. 2 is a detailed view of the fiber laser of FIG. 1 with Bragg gratings used as reflectors and as a coupler.

There may be one or more Bragg grating means in the fiber optic element 18. For example, fiber optic element 18a, FIG. 2, includes fiber gratings 20 and 22 spaced apart to form a resonant cavity 24 between them where the lasing takes place. One or more additional Bragg gratings 26 may be employed in the resonant cavity 24 to provide a coupling or loss port 28 through which unwanted frequencies are deflected out of the resonant cavity 24.

Figure 3:
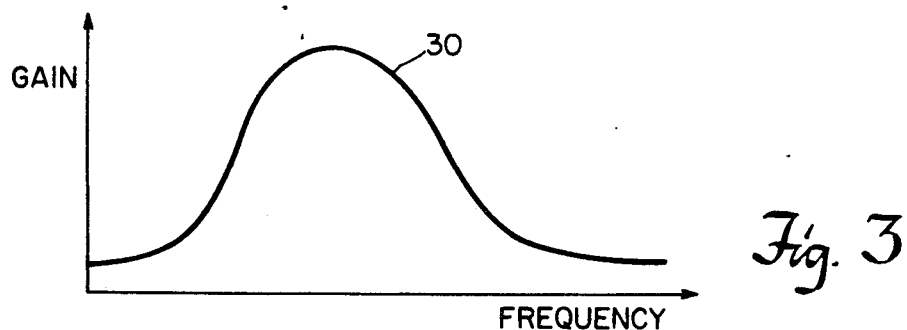
FIG. 3 illustrates the gain characteristic of the fiber laser of FIG. 2.
Figure 4:
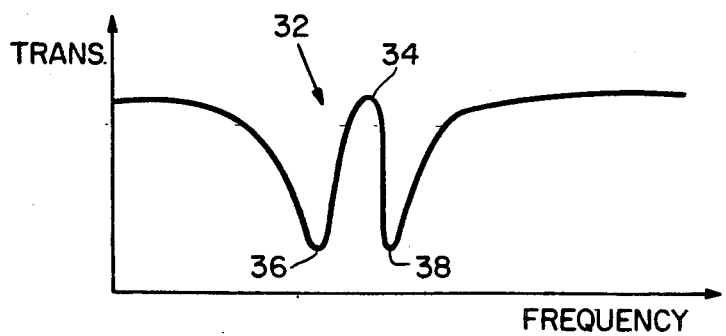
FIG. 4 illustrates the transmission characteristic effected by the loss through the Bragg coupler shown in FIG. 2.
Figure 5:
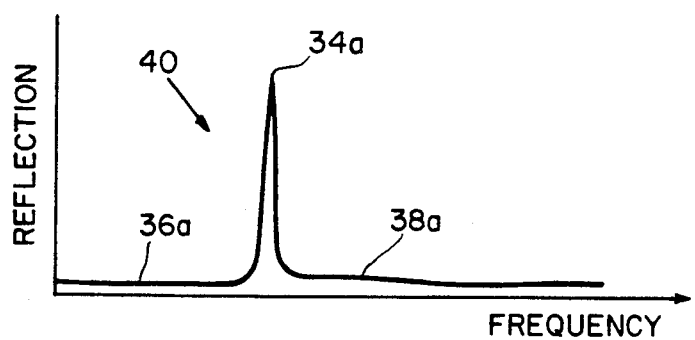
FIG. 5 is the reflection characteristic showing the narrow bandwidth effected by the Bragg grating reflectors of FIG. 2.

Typically fiber doped with RE ions 10 has a bell-shaped gain characteristic 30, FIG. 3, which provides a broadband gain medium. By using a Bragg grating 26 as a loss port or coupler 28, the loss is enhanced in the neighborhood of a predetermined selected laser frequency, for example transmission characteristic 32, FIG. 4, where transmissivity is highest at the predetermined or selected laser frequency 34 but is low in the regions 36 and 38 surrounding it. That is, there is high loss of the laser light in the frequencies closely adjacent to the selected frequency 34. Thus the selectivity of the overall laser output is enhanced. The output can be further enhanced by means of Bragg gratings 20 and 22, FIG. 2, which are highly selective in the reflection of a desired frequency as indicated by the reflection characteristic 40, FIG. 5, where the desired frequency 34a has a sharply higher reflection value than the frequencies surrounding it at 36a and 38a.

Figure 6:
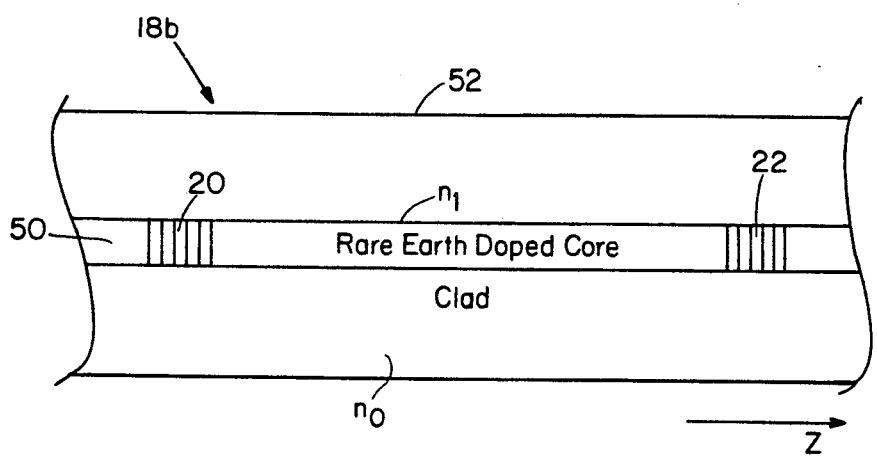
FIG. 6 is an enlarged detailed view of a fiber optic element according to this invention.
Figure 7:
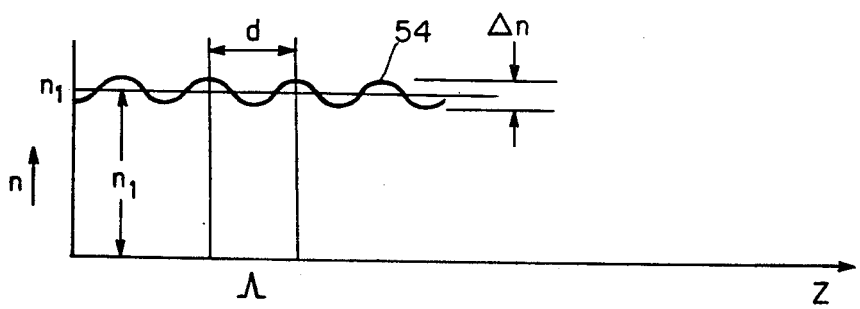
FIG. 7 illustrates the periodic variation of the index of refraction of the core of the fiber optic element FIG. 6 which defines a Bragg reflective grating.
Figure 8:
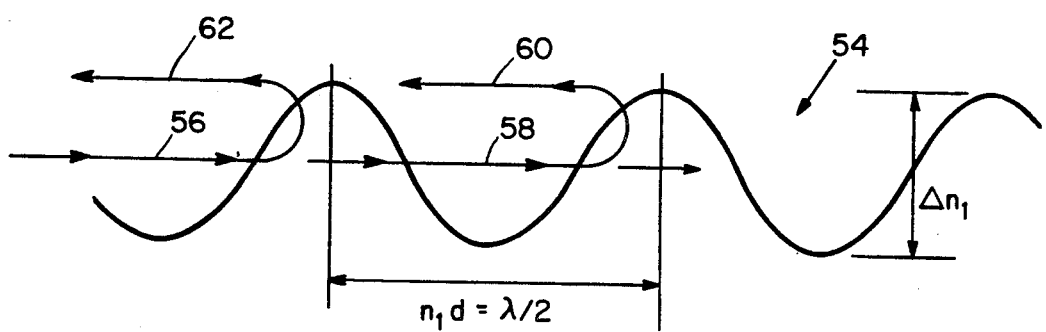
FIG. 8 illustrates the Bragg phenomenon which results in the reflective property of a Bragg grating.

The operation of reflection Bragg gratings 20 and 22 are explained with reference to FIGS. 6–8. A Bragg grating 20 integral with core 50 surrounded by cladding 52 in fiber optic element 18b, FIG. 2, has a variation in its index of refraction as indicated by the periodic function 54 labelled $n_I$ in FIG. 7. The value $n_1$ is represented by the distance to the center line of characteristic 54. The peak-to-peak extent of the sinusoidal fluctuations are referred to as $\Delta n$ as in the expression $$n = n_1 + \Delta n/2 \sin(2\pi/\Lambda - \phi)$$

It is these fluctuations that are induced, typically by a photorefractive technique, to create and define, the Bragg grating. When the Bragg grating is so constructed that the periodicity of the index of refraction variation is equivalent to one half the wavelength of the selected predetermined laser light, as shown in FIG. 8, then light propagating along core 50 as indicated by rays 56 and 58 is retro-reflected, that is, redirected reverse to the direction of propagation as indicated by rays 60 and 62. In order to obtain the fully reflective properties, the optical path distance $n_I d$ must equal one half of the wavelength of the selected laser light. This reflection occurs in both directions within the resonant cavity so that the necessary light amplification and selection occurs. Although the preferred technique for fabricating the periodic variation in the index of refraction in core 50 is by photorefractive techniques, this is not a necessary limitation of the invention as standing wave, elastic waves as well as conventional etching techniques may be used to accomplish the necessary variation.

Figure 9:
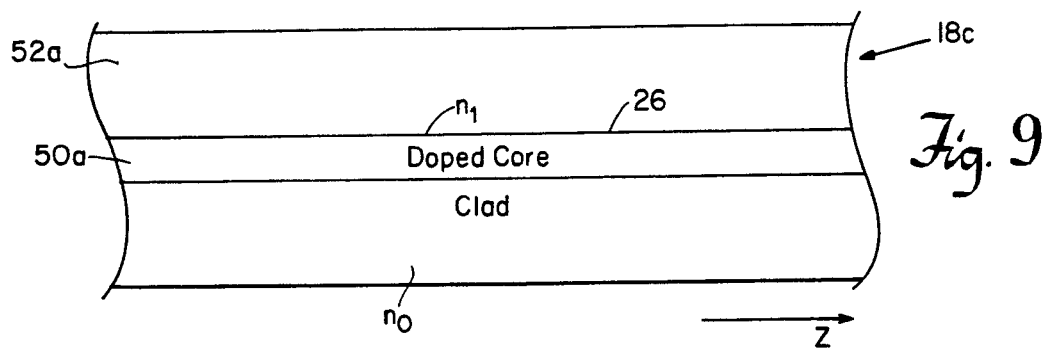
FIG. 9 is a view similar to FIG. 6 utilizing a Bragg grating as a loss port or coupler.
Figure 10:
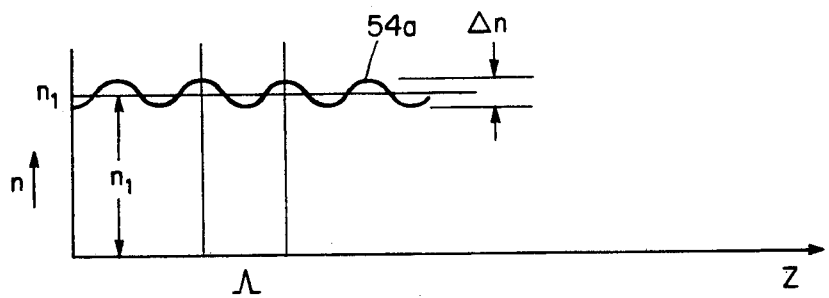
FIG. 10 is a view similar to FIG. 7 showing the periodic variation in the index of refraction in the core of the fiber optic element of FIG. 9.
Figure 11:
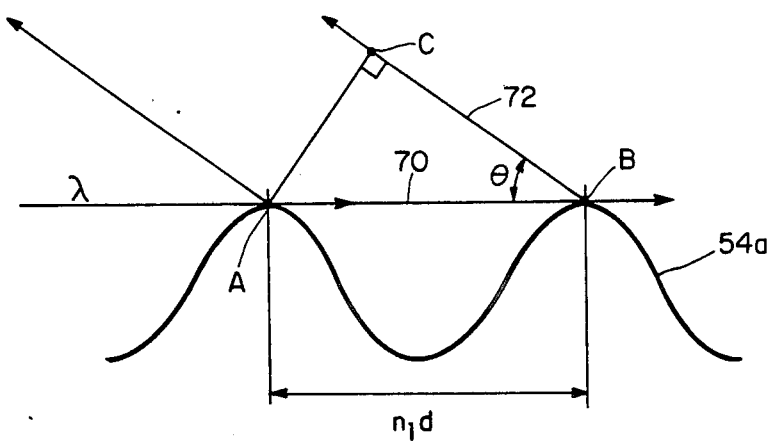
FIG. 11 illustrates the deflection property of the Bragg grating which causes the loss of the unwanted wavelength.

The loss port or coupling duct Bragg grating 26 located in core 50a, FIG. 9, of fiber optic element 18c is also formed by inducing a periodic variation as indicated in characteristic 54, FIG. 10, in core 50a. However, in this instance the optical path distance $n_I d$ is equal to the periodicity $\Lambda$ 54a, and is not at the center line of the desired frequency. Rather, in this case the wavelength has to be such that the optical path distance from point A, FIG. 11, to point B, plus the distance from point B to point C, should equal one full wavelength of the unwanted radiation so that period E is defined by $\lambda/(n_I + n_0 \cos\theta)$, where $n_I$ is the refractive index of core 50a, $n_0$ is the refractive index of cladding 52a, $\theta$ is the angle between the incoming ray 70 and the deflected ray 72, and $\lambda\theta$ is the wavelength of the frequencies which are to be deflected or lost.

Figure 12:
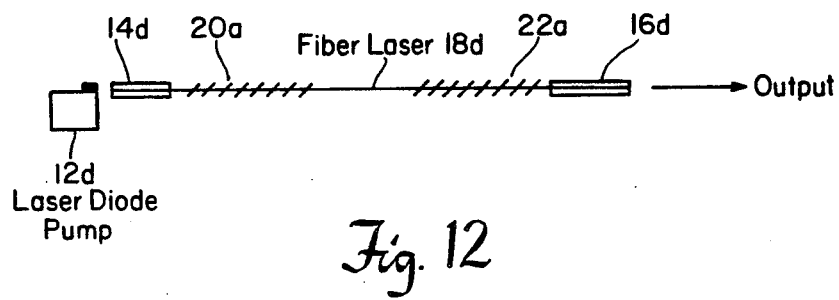
FIG. 12 is a schematic diagram showing a fiber laser according to this invention with two gratings each tuned to a different wavelength.
Figure 13:
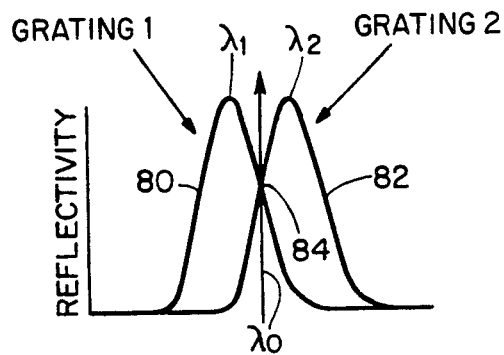
FIG. 13 shows the selectivity obtained at the junction of the gratings due to the overlap of the grating reflectivity response.

Gratings 20 and 22 may be tuned to the same wavelength or may be tuned to different wavelengths as indicated in FIG. 12, where grating 20a is tuned to a wavelength $\lambda_1$, slightly less than the center wavelength $\lambda_0$, and grating 22a is tuned wavelength $\lambda_2$ which is slightly greater than $\lambda_0$, FIG. 13. The output laser light then is defined in the region 84, where the two reflectivity envelopes 80, 82 overlap. This enables region 84, the overlap region, to be made much narrower for a much sharper bandwidth than could be accomplished by the individual naturally occurring envelopes 80 and 82.

Figure 14:
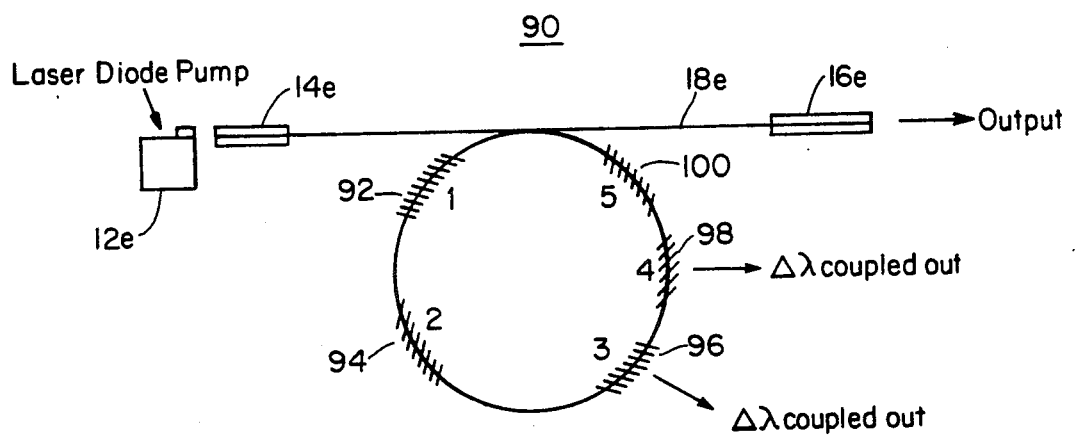
FIG. 14 is a schematic diagram of a ring fiber laser according to this invention.
Figure 15:
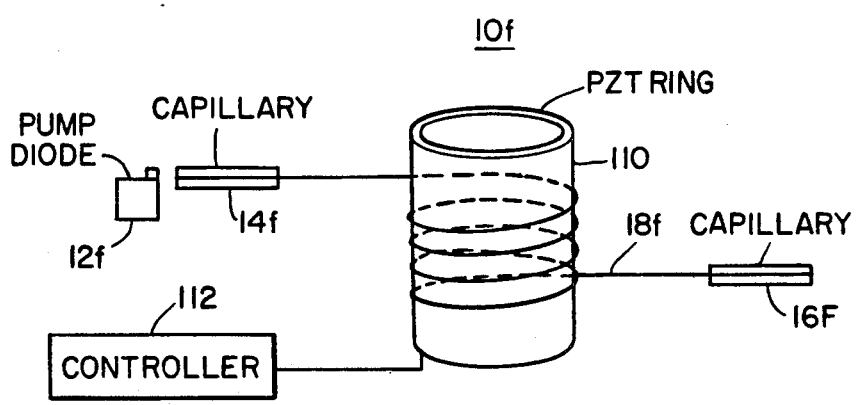
FIG. 15 is a schematic diagram of a tunable fiber laser according to this invention utilizing a piezoelectric ring to stretch the fiber and shift the reflection characteristic of FIG. 5.

The fiber laser according to this invention may also be embodied in a fiber ring laser 90, FIG. 14, which requires no reflective gratings but may use one or more coupling gratings 92, 94, 96, 98 and 100, as previously described.

Figure 16:
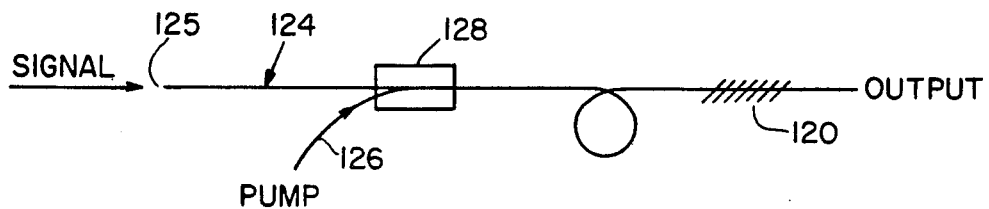
FIG. 16 is a schematic diagram of a fiber amplifier using a Bragg grating filter according to this invention.
Figure 17:
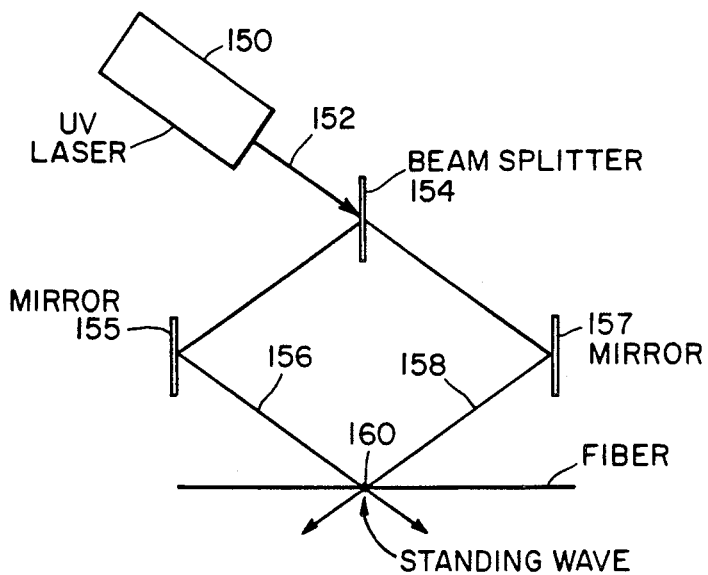
FIG. 17 is a schematic diagram of a photorefractive system for inducing a Bragg grating in a fiber optic element.

In addition to being a "single-frequency" or very narrow-band laser, the laser according to this invention may also have the contrasting feature of a broadband tuning capability. For example, laser 10f may have its fiber optic element 18f wrapped around a piezoelectric ring 110 which is connected to a controller 112. When controller 112 is energized to apply a voltage to ring 110, electro-optic element 18 is stressed by stretching, for example. This changes the periodicity of the Bragg grating and so shifts the reflection characteristic 40 in FIG. 5. The Bragg grating according to this invention has been embodied in various fiber lasers, but it may also be used as a Bragg grating filter 120, FIG. 16, in fiber amplifiers as well. Typically an erbium-doped fiber amplifier 122 includes a primary fiber optic element 124, an input port 125 and pump port 126, which intersect at a wavelength dispersive coupler 128. Bragg grating filter 120 is an amplified spontaneous emission filter which filters out unwanted frequencies.

Figure 18:
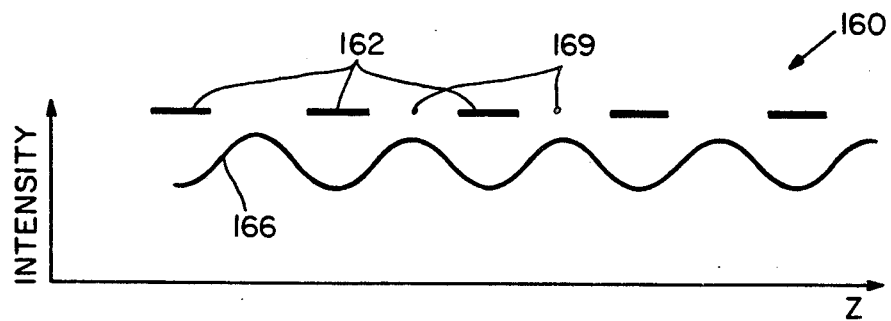
FIG. 18 is an enlarged view of the interference pattern generated in FIG. 17.

This invention also involves a method of fabricating a Bragg grating filter internal to and integral with the fiber optic element. The photorefractive technique for inducing a periodic variation in the index of refraction in the core of a fiber optic element uses an ultraviolet light source such as UV laser 150, which directs its output beam 152 onto a beam splitter 154 to provide two coherent interfering beams 156, 158 through mirrors 155 and 157, which combine to form an interference pattern in region 160. This region, enlarged in FIG. 18, creates a sinusoidal series of bright 162 and dark 164 fringed spaces which, when cast upon a germanium-doped fiber optic element, alter the index of refraction in the core as indicated by characteristic sinusoid 166. In this manner there is effected a simple, non-invasive fabrication of the necessary periodic variations in the index of refraction of the core of the fiber optic element which is necessary to define the Bragg grating used as a reflector to sharpen the lasing frequency band, or as a deflector to enhance the loss through coupling out of the unwanted frequencies. The photorefractive techniques have been explained in G. Meltz, W. W. Morey, and W. H. Glenn, "Formation of Bragg Gratings in Optical Fibers by a Transverse Holographic Method", Opt. Lett. 14, 823–825 (1989).

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. In a fiber laser the combination comprising:
   a fiber optic element; and
   a Bragg grating means in said fiber optical element and defined by a periodic variation in the index of refraction of said element, which period is a function of one half of the wavelength of a preselected lasing frequency for reflecting a narrow band of frequencies at the preselected frequency to establish a resonant cavity.

2. The device of claim 1 in which said fiber optic element is doped with a rare earth.

3. The device of claim 2 in which the rare earth dope is neodymium.

4. The device of claim 2 in which the rare earth dope is erbium.

5. The device of claim 1 in which said fiber optic element is a single-mode element.

6. The device of claim 1 in which said Bragg grating means includes two spaced Bragg gratings with the resonator cavity between them.

7. The device of claim 1 in which said Bragg grating means includes a Bragg grating extending through the resonator cavity.

8. The device of claim 1 in which said fiber optic element is germanium-doped.

9. The device of claim 8 in which said Bragg grating means is fixed in said element with a photorefractive exposure.

10. The device of claim 1 in which said Bragg grating means is integral with said fiber optic element.

11. The device of claim 1 in which said fiber laser is an oscillating laser.

12. The device of claim 1 in which said fiber laser is an amplifying laser.

13. In a fiber laser the combination comprising:
    a fiber optic element; and
    Bragg grating means disposed in said fiber optic element and defined by a periodic variation in the index of refraction of said element, said period establishing constructive non-reflective interference to cause loss at a band of wavelengths other than the lasing frequency at a predetermined deflection angle.

14. The device of claim 13 in which said fiber optic element is doped with a rare earth.

15. The device of claim 14 in which the rare earth dope is neodymium.

16. The device of claim 14 in which the rare earth dope is erbium.

17. The device of claim 14 in which said fiber optic element is a single-mode element.

18. The device of claim 13 in which said Bragg grating means includes at least one Bragg grating for coupling out said other laser frequencies.

19. The device of claim 18 in which each said Bragg grating has a period d defined by $\lambda/n_l + n_0 \cos\theta$, where $n_0$ is the index of refraction of the fiber optic element cladding, $n_l$ is the index of refraction of the core, $\lambda\theta$ is the wavelength of the lasing frequency and $\theta$ is the predetermined angle of deflection.

20. The device of claim 13 in which said Bragg grating means includes a Bragg grating extending through the resonator cavity.

21. The device of claim 13 in which said fiber optic element is germanium-doped.

22. The device of claim 21 in which said Bragg grating means is fixed in said element with a photorefractive exposure.

23. The device of claim 13 in which said Bragg grating means is integral with said fiber optic element.

24. The device of claim 13 in which said fiber laser is an oscillating laser.

25. The device of claim 13 in which said fiber laser is an amplifying laser.

26. In a fiber laser the combination comprising:
a fiber optic element; and
first Bragg grating means in said fiber optic element and defined by a periodic variation in the index of refraction of said element, which period is equal to one half of the wavelength of a preselected lasing frequency for reflecting a narrow band of frequencies at the preselected frequency to establish a resonant cavity;
second Bragg grating means disposed in said fiber optic element and defined by a periodic variation in the index of refraction of said element, said period establishing constructive non-reflective interference to cause loss at a band of wavelengths other than the lasing frequency at a predetermined deflection angle.

27. A method of making a fiber optic element for a fiber laser with an integral Bragg grating comprising:
doping the fiber optic element of the fiber laser with germanium to make it photorefractively sensitive; and
irradiating at least a portion of said fiber optic element with a pattern of ultraviolet radiation to induce a period variation in the refractive index of the fiber optic element core to define a Bragg grating.

28. A fiber optic element made according to the method of claim 27.

29. A fiber laser comprising:
pumping means; and
a fiber optic element including Bragg grating means in said element and defined by a periodic variation in the index of refraction of said element, which period is a function of one half of the wavelength of a preselected lasing frequency for reflecting a narrow band of frequencies at the preselected frequency to establish a resonant cavity.

30. A fiber laser comprising:
a pumping means;
a fiber optic element; and
Bragg grating means disposed in said fiber optic element and defined by a periodic variation in the index of refraction of said element, said period establishing constructive non-reflective interference to cause loss at a band of wavelengths other than the lasing frequency at a predetermined deflection angle.

31. A fiber laser comprising:
pumping means;
a fiber optic element;
first Bragg grating means in said fiber optic element and defined by a periodic variation in the index of refraction of said element, which period is equal to one half of the wavelength of a preselected lasing frequency for reflecting a narrow band of frequencies at the preselected frequency to establish a resonant cavity; and
second Bragg grating means disposed in said fiber optic element and defined by a periodic variation in the index of refraction of said element, said period establishing constructive non-reflective interference to cause loss at a band of wavelengths other than the lasing frequency at a predetermined deflection angle.

* * * * *